(12) United States Patent
Takagi (10) Patent No.: US 8,657,058 B2
(45) Date of Patent: Feb. 25, 2014

(54) VEHICLE

(75) Inventor: Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 20 days.

(21) Appl. No.: 13/339,343

(22) Filed: Dec. 28, 2011

(65) Prior Publication Data

US 2013/0168177 A1 Jul. 4, 2013

(51) Int. Cl.
*B60K 1/00* (2006.01)

(52) U.S. Cl.
USPC ............................. 180/291; 180/68.5

(58) Field of Classification Search
USPC ............... 180/65.1, 68.2, 68.5, 65.24, 65.22, 180/65.8, 291
See application file for complete search history.

(56) References Cited

U.S. PATENT DOCUMENTS

| | | | | |
|---|---|---|---|---|
| 5,488,837 A | * | 2/1996 | Sekino et al. | 62/244 |
| 5,501,289 A | * | 3/1996 | Nishikawa et al. | 180/68.5 |
| 6,094,927 A | * | 8/2000 | Anazawa et al. | 62/239 |
| 6,227,322 B1 | * | 5/2001 | Nishikawa | 180/68.5 |
| 6,598,691 B2 | * | 7/2003 | Mita et al. | 180/65.1 |
| 7,051,825 B2 | * | 5/2006 | Masui et al. | 180/68.5 |
| 7,396,075 B2 | * | 7/2008 | Ohkuma et al. | 297/180.1 |
| 7,854,282 B2 | * | 12/2010 | Lee et al. | 180/65.24 |
| 7,877,184 B2 | * | 1/2011 | Watanabe et al. | 180/65.28 |
| 8,127,876 B2 | * | 3/2012 | Phillips | 180/68.2 |
| 8,372,530 B2 | * | 2/2013 | Kubota et al. | 180/65.1 |

FOREIGN PATENT DOCUMENTS

JP 2004-136747 A 5/2004

* cited by examiner

*Primary Examiner* — Hau Phan
(74) *Attorney, Agent, or Firm* — Alleman Hall McCoy Russell & Tuttle LLP (57) ABSTRACT

A vehicle is presented. The vehicle may include a vehicle body frame; a drive wheel suspended from the vehicle body frame; a drive motor for driving the drive wheel; a battery for supplying electric power to the drive motor; a floor panel constituting a floor surface of the vehicle; and a battery support plate having a battery placement surface on which the battery is placed; wherein the battery support plate and the floor panel are supported on the vehicle body frame; and the battery placement surface is positioned below an upper surface of the floor panel.

6 Claims, 9 Drawing Sheets

VEHICLE

BACKGROUND OF THE INVENTION

1. Field of the Invention

The present invention relates to a vehicle including a drive motor for driving a drive wheel and a battery for supplying electric power to the drive motor.

2. Description of the Related Art

Japanese Laid-Open Patent Application Publication No. 2004-136747 discloses an exemplary conventional vehicle including a battery. In this vehicle, a floor surface is positioned above a vehicle body frame and the battery is placed on the floor surface. This placement makes the center of gravity of the battery higher. If the vehicle includes a drive motor for driving the vehicle and a plurality of batteries or a large-sized battery is/are used as a battery for supplying the electric power to the drive motor, the center of the gravity of the battery or batteries becomes higher, and the weight of the battery or batteries increases. This may make driving the vehicle unstable.

SUMMARY OF THE INVENTION

The present invention addresses the above described condition, and an object of the present invention is to lower the center of gravity of the battery to enable the vehicle to drive stably.

A vehicle of the present invention comprises a vehicle body frame; a drive wheel suspended from the vehicle body frame; a drive motor for driving the drive wheel; a battery for supplying electric power to the drive motor; a floor panel constituting a floor surface of the vehicle; and a battery support plate having a battery placement surface on which the battery is placed; wherein the battery support plate and the floor panel are supported on the vehicle body frame; and the battery placement surface is positioned below an upper surface of the floor panel.

In accordance with this configuration, since the battery placement surface of the battery support plate is positioned lower than the upper surface of the floor panel, the center of gravity of the battery placed on the battery placement surface can be lowered, and thus the vehicle can drive stably.

The above and further objects, features and advantages of the invention will more fully be apparent from the following detailed description with reference to the accompanying drawings.

DETAILED DESCRIPTION OF THE PREFERRED EMBODIMENTS

Hereinafter, an embodiment of the present invention will be described with reference to the drawings. The stated directions are referenced from the perspective of a driver riding in the vehicle. A rightward and leftward direction conforms to a vehicle width direction. It is supposed that the vehicle is in a stopped state on a ground surface which is substantially parallel to a horizontal plane.

Figure 1:
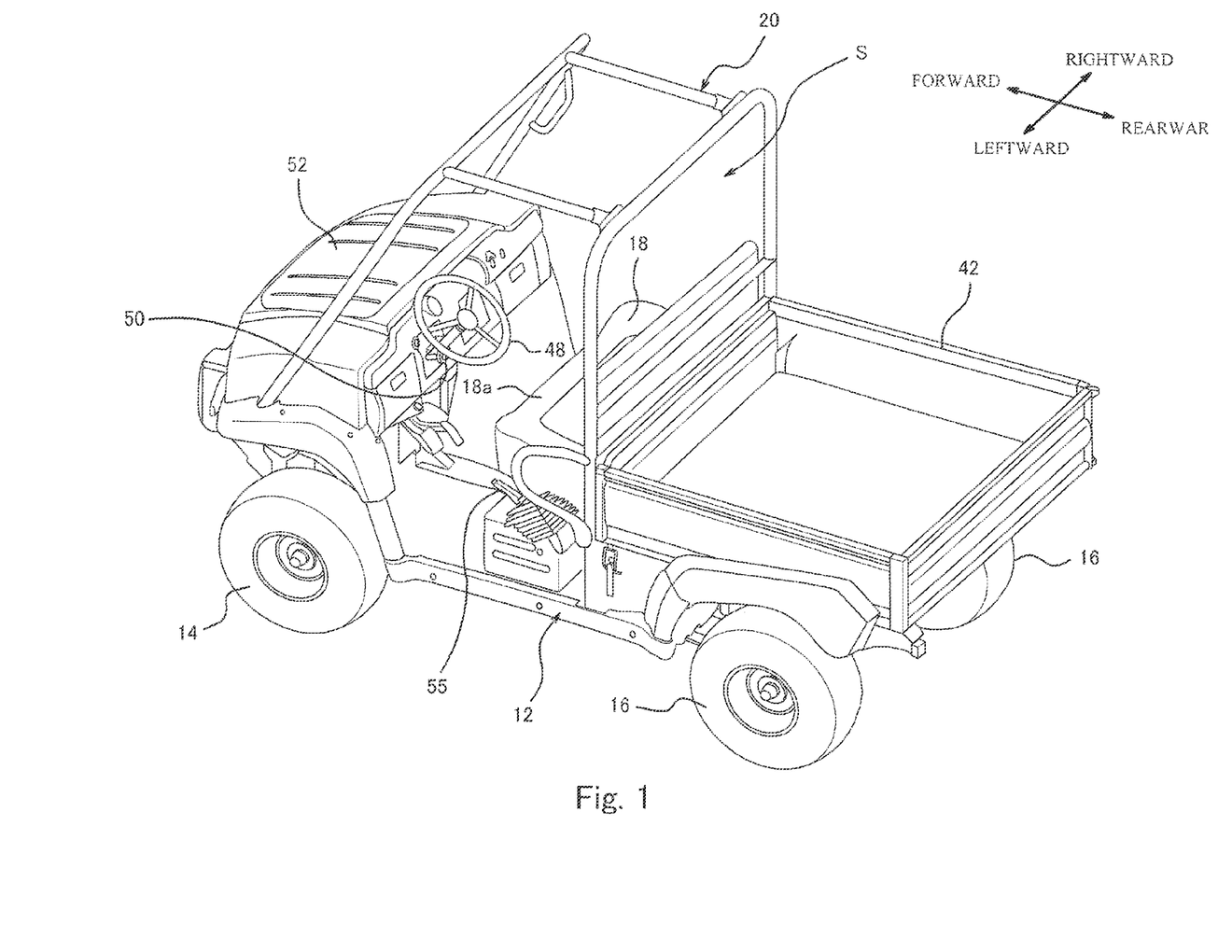
FIG. 1 is a perspective view showing an external appearance of a vehicle according to an embodiment, when viewed from obliquely above.
Figure 2:
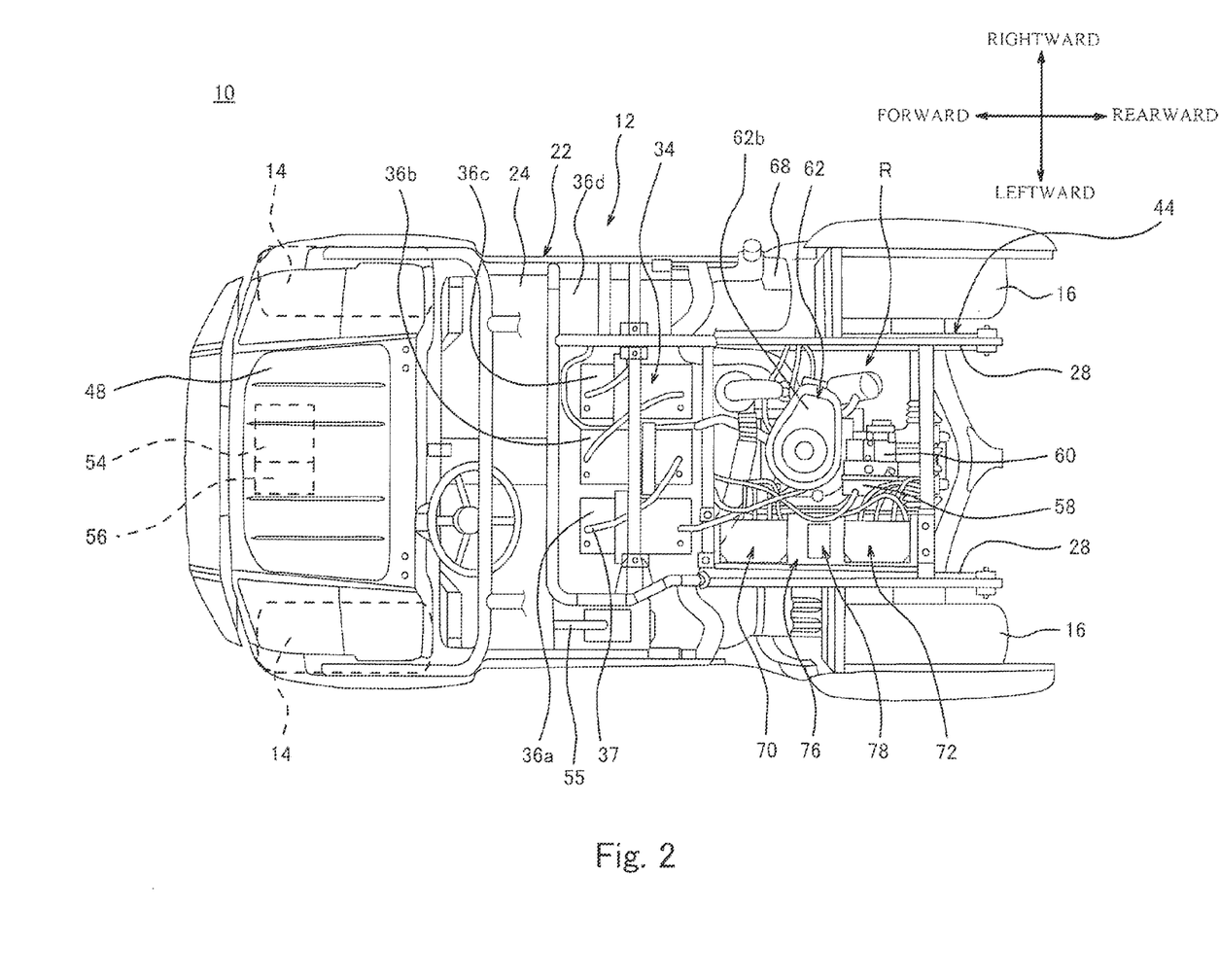
FIG. 2 is a plan view of the vehicle according to the embodiment, showing a state where a seat and a cargo bed are detached from the vehicle.

FIG. 1 is a perspective view showing an external appearance of a vehicle 10 according to an embodiment, when viewed from obliquely above. FIG. 2 is a plan view of the vehicle 10 according to the embodiment, showing a state where a seat 18 (FIG. 1) and a cargo bed 42 (FIG. 1) are detached from the vehicle 10. In the present embodiment, the vehicle 10 is used in various uses, for example, as a golf cart, or a farming truck, and is sometimes referred to as a utility vehicle.

As shown in FIG. 1, the vehicle 10 includes a vehicle body frame 12, a pair of right and left front wheels 14 suspended from the front portion of the vehicle body frame 12, a pair of right and left rear wheels 16 suspended from the rear portion of the vehicle body frame 12, a bench seat 18 provided in a center portion of the vehicle body frame 12 in a forward and rearward direction (lengthwise direction of the vehicle 10) to extend in the vehicle width direction, and a cabin frame 20 surrounding the seat 18. A cabin space S is defined as a region where the seat 18 is disposed, inwardly relative to the cabin frame 20. As shown in FIG. 2, below the seat 18 (FIG. 1) in the center portion of the vehicle body frame 12, in the forward and rearward direction, a plurality of batteries 36a~36d constituting a battery unit 34 are arranged in the vehicle width direction.

Figure 3:
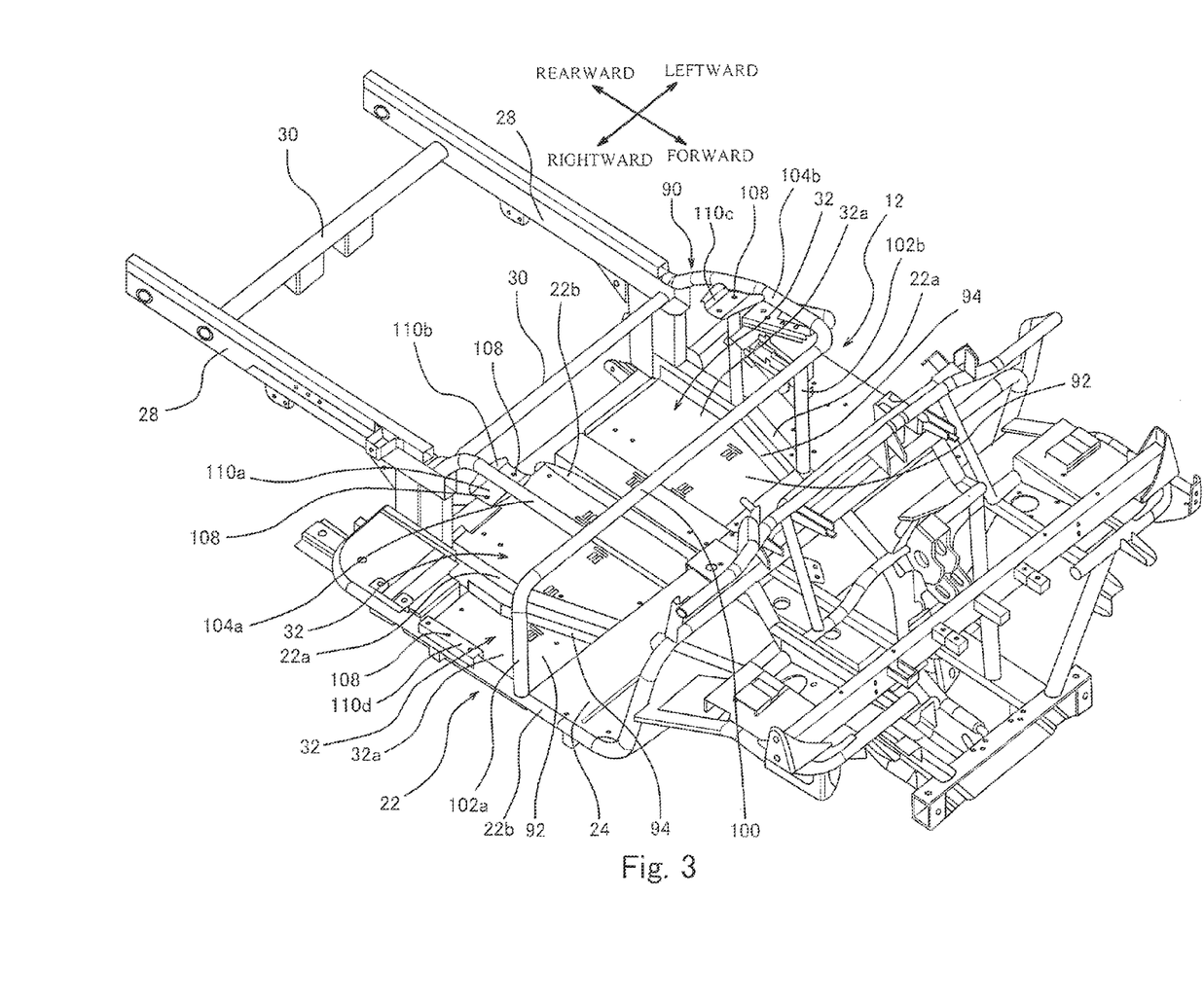
FIG. 3 is a perspective view showing a configuration of a vehicle body frame, a floor panel, and battery support plates, when viewed from obliquely above.
Figure 4:
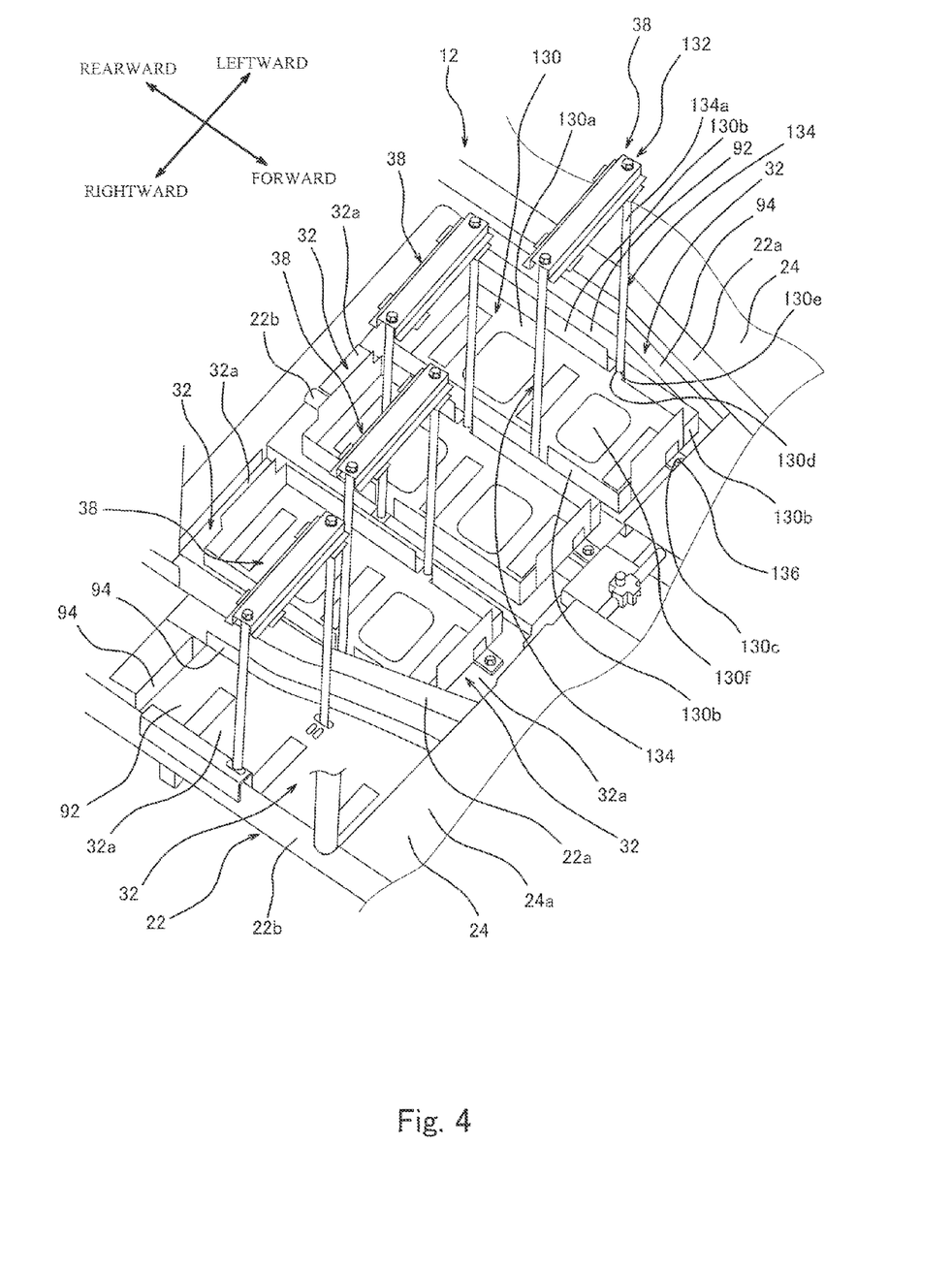
FIG. 4 is a perspective view showing a state where battery holders are mounted to the battery support plates, respectively, when viewed from obliquely above.

FIG. 3 is a perspective view showing a configuration of the vehicle body frame 12, a floor panel 24, and battery support plates 32, when viewed from obliquely above. FIG. 4 is a perspective view showing a state where battery holders 38 are mounted to the battery support plates 32, respectively, when viewed from obliquely above.

As shown in FIG. 3, the vehicle body frame 12 includes a main frame 22 placed to face the road surface or the ground surface, a pair of right and left rear side frames 28 coupled to the rear portion of the main frame 22 via coupling members 26 and extending in the forward and rearward direction, two rear cross members 30 provided between and coupled to the rear side frames 28, and a seat support frame 90 provided to correspond to the main frame 22 and the rear side frames 28.

Figure 6:
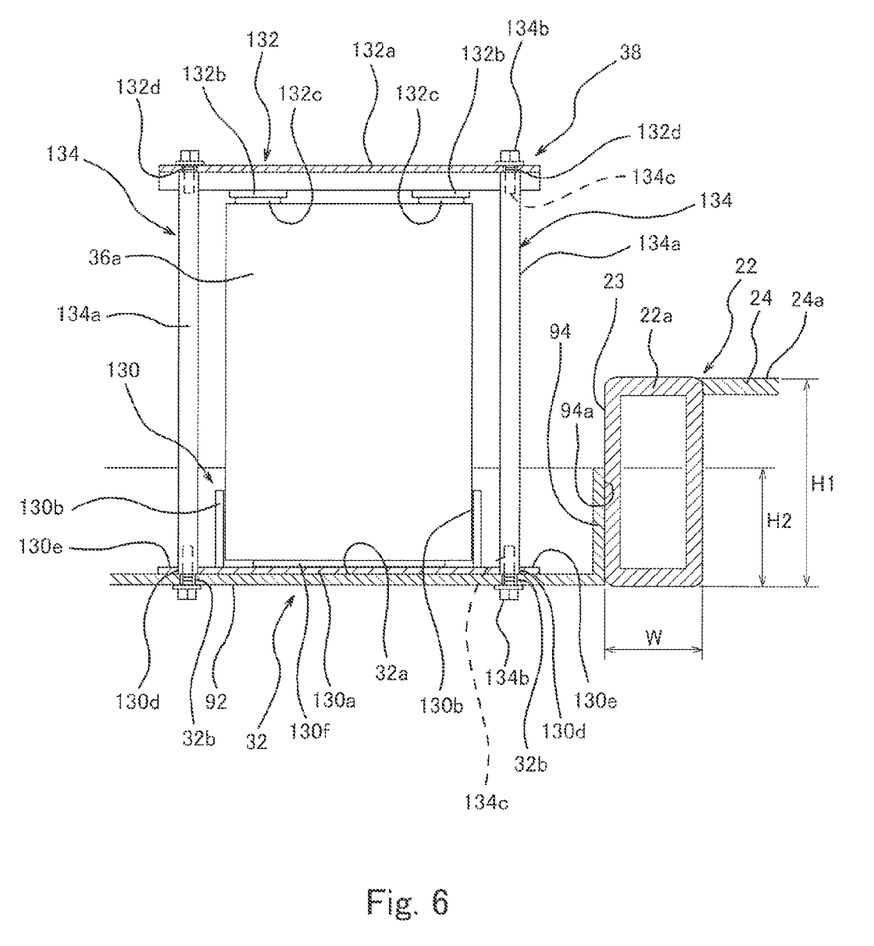
FIG. 6 is a cross-sectional view showing a configuration of a first floor member, the battery support plate, a battery and the battery holder.

As shown in FIGS. 3 and 4, the main frame 22 includes a plurality of first floor members 22a which are of a substantially square-pipe shape and have side surfaces substantially parallel to an upward and downward direction (vertical direction) and a plurality of second floor members 22b which are of a substantially round-pipe shape. The plurality of first floor members 22a and the plurality of second floor members 22b are joined together. The first floor members 22a and the second floor members 22b are disposed in a portion of the main frame 22, constituting the floor of the cabin space S (FIG. 1) and a portion of the main frame 22 which is below the seat 18 (FIG. 1). The floor panel 24 is mounted to the first floor members 22a and the second floor members 22b, constituting the floor of the cabin space S, while the battery support plates 32 are mounted to the first floor members 22a and the second floor members 22b which are below the seat 18 (FIG. 1). In other words, the floor panel 24 and the battery support plates 32 are supported on the first floor members 22a and the second floor members 22b. As shown in FIG. 6, the first floor member 22a has a cross-sectional shape of a substantially rectangular shape and is designed such that its vertical length H1 (length in the upward and downward direction) is much longer than its width W. Because of this structure, the first floor member 22a has a high stiffness with respect to a load applied vertically, and can support the floor panel 24 and the battery support plate 32 with a high stiffness.

Figure 5:
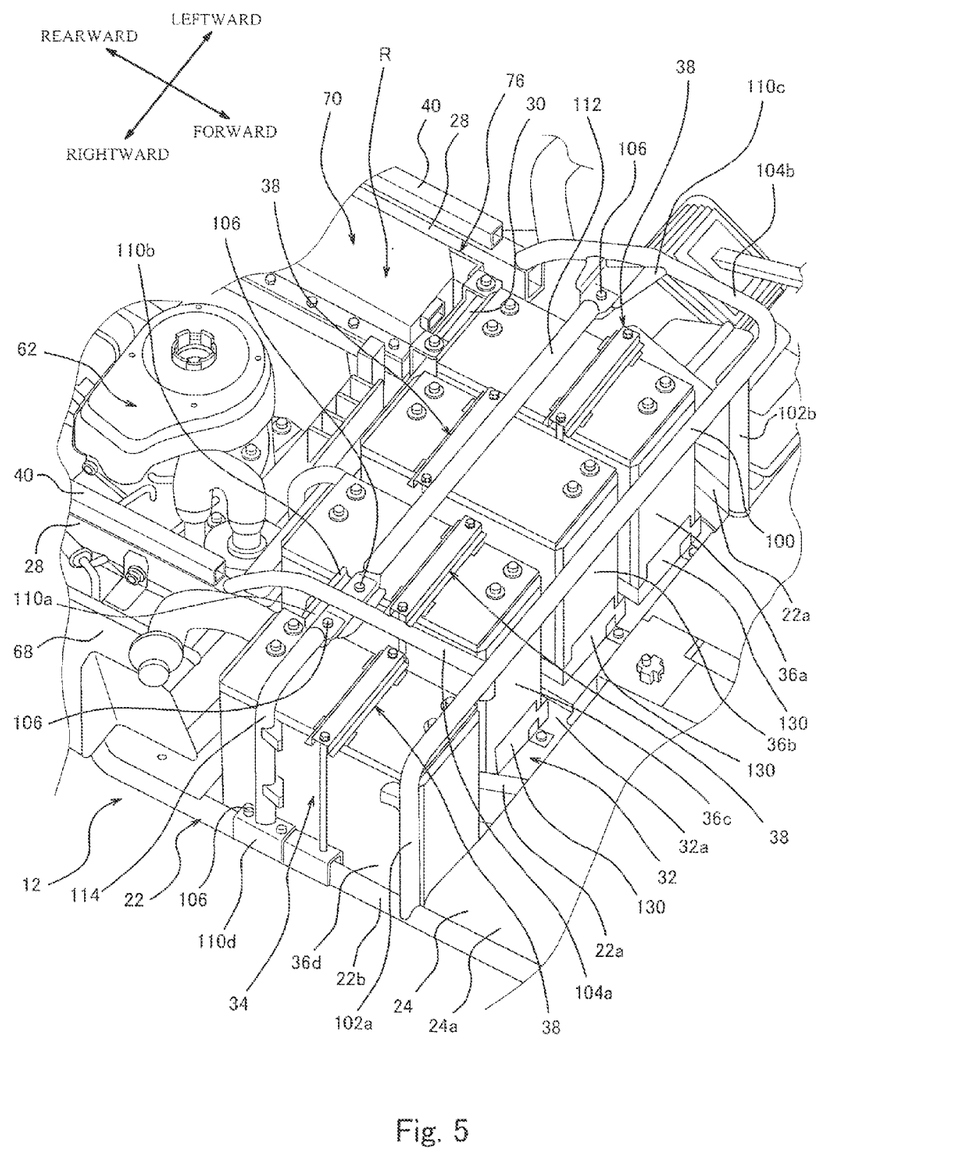
FIG. 5 is a perspective view showing a configuration of the vehicle body frame and a battery unit in the vehicle according to the embodiment, when viewed from obliquely above.

As shown in FIGS. 3 and 4, the floor panel 24 is a member of a substantially plate shape constituting the floor surface of the cabin space S (FIG. 1), i.e., the floor surface of the vehicle 10. An upper surface 24a of the floor panel 24 is substantially as high as or higher than a highest point of the first floor members 22a and the second floor members 22b. The battery support plates 32 are members of a substantially plate shape for supporting the corresponding batteries 36a~36d, respectively (FIG. 5). The upper surfaces of the battery support plates 32, i.e., battery placement surfaces 32a are below the upper surface 24a of the floor panel 24.

Figure 7:
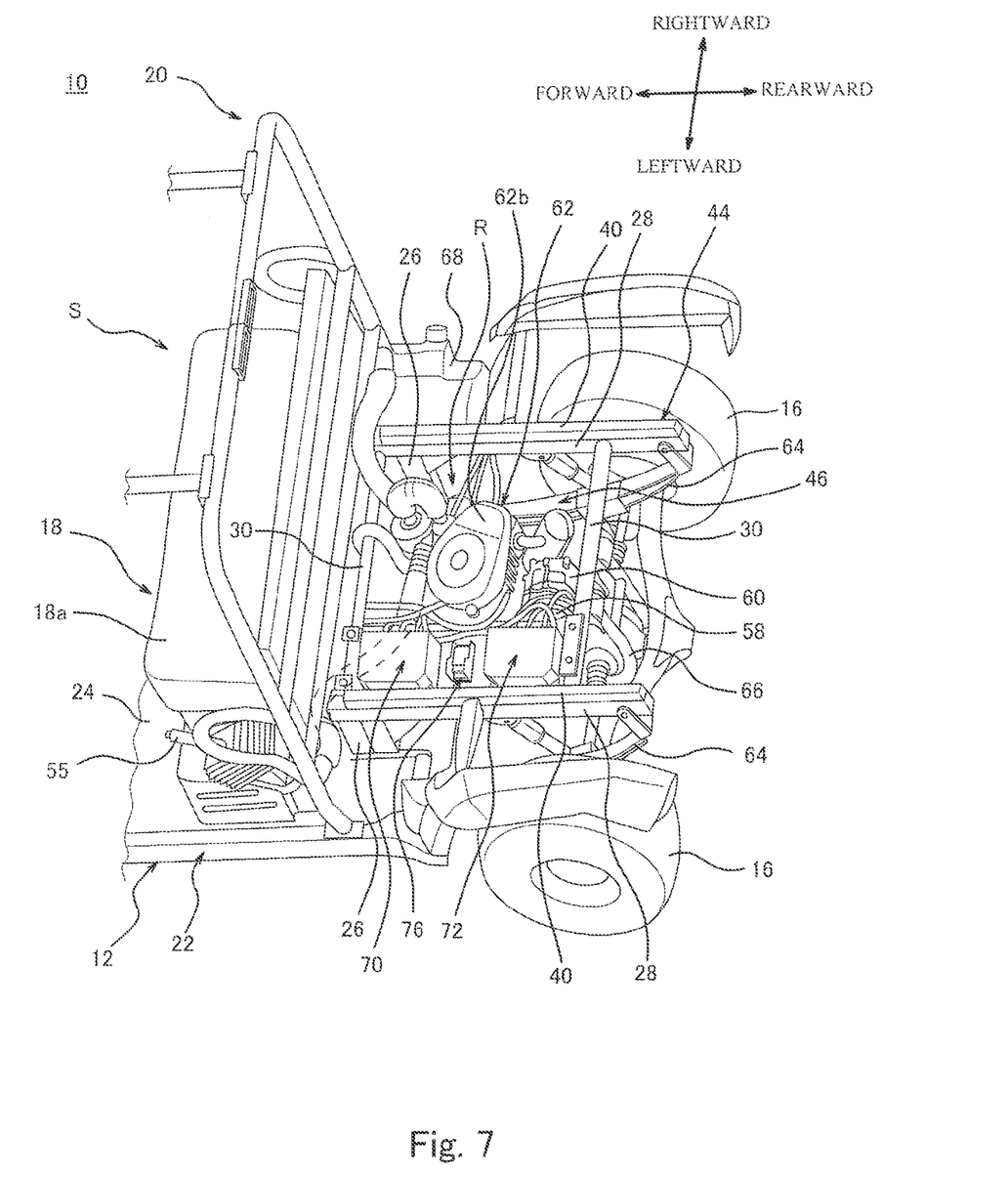
FIG. 7 is a perspective view of the vehicle according to the embodiment, showing a state where the cargo bed is detached from the vehicle, when viewed from obliquely above.

FIG. 5 is a perspective view showing a configuration of the vehicle body frame 12 and the battery unit 34 in the vehicle 10, when viewed from obliquely above. FIG. 6 is a cross-sectional view showing a configuration of the first floor member 22a, the battery support plate 32, the battery 36a and the battery holder 38. FIG. 7 is a perspective view of the vehicle 10, showing a state where the cargo bed 42 (FIG. 1) is detached from the vehicle 10, when viewed from obliquely above.

As shown in FIGS. 4 and 6, each of the battery support plates 32 includes a battery placement portion 92 having the battery placement surface 32a on which the corresponding one of the batteries 36a~36d (FIG. 5) is placed, and a joint portion 94 extending upward from the edge of the battery placement portion 92. When viewed from above, the shape of the battery placement portion 92 is defined by the first floor member 22a (FIG. 4) and the second floor member 22b (FIG. 4). The joint portion 94 extends upward from a portion of the edge of the battery placement portion 92, which portion faces to a side surface 23 (FIG. 6) of the first floor member 22a. As shown in FIG. 6, an outer side surface 94a of the joint portion 94 is in contact with the side surface 23 of the first floor member 22a and is joined to the side surface 23 by welding. The joint portion 94 is designed so that its vertical length H2 is greater than the width W of the first floor member 22a and is smaller than the vertical length H1 of the first floor member 22a. Since the vertical length H1 of the first floor member 22a is much greater than the width W of the first floor member 22a in the present embodiment, a joint stiffness between the battery support plate 32 and the first floor member 22a is enhanced by utilizing the vertical length H1 effectively.

As shown in FIG. 4, in the present embodiment, the battery placement surface 32a of the battery support plate 32 is substantially as high as the lower surface of the first floor member 22a. However, the height of the battery placement surface 32a is not particularly limited so long as the battery placement surface 32a is below the upper surface 24a of the floor panel 24. For example, the battery placement surface 32a may be positioned between the upper surface of the first floor member 22a and the lower surface of the first floor member 22a, or below the lower surface of the first floor member 22a. When the battery placement surface 32a is positioned below the lower surface of the first floor member 22a, the vertical length H2 depicted in FIG. 6 is increased by a length corresponding to a distance from the lower surface of the first floor member 22a to the battery placement surface 32a.

As shown in FIG. 7, the coupling members 26 are members of a substantially plate shape extending vertically. The lower end portion of each of the coupling members 26 is coupled to the main frame 22, while the upper end portion of each of the coupling members 26 is coupled to the front end portion of the corresponding rear side frame 28. Therefore, the rear side frame 28 is positioned higher than the main frame 22 by a length of the coupling member 26, and the distance from the road surface or the ground surface to the rear side frame 28 is greater than the distance from the road surface or the ground surface to the main frame 22. The rear side frame 28 is a member of a substantially square-pipe shape. A cargo bed support member 40 of a substantially square-pipe shape is coupled to the upper surface of the corresponding rear side frame 28.

As shown in FIG. 7, the two rear side frames 28 are arranged substantially in parallel to be apart from each other in the vehicle width direction. The two rear side frames 28 are coupled together by means of the two rear cross members 30 extending in the vehicle width direction. In this structure, a frame member 44 of a substantially rectangular shape when viewed from above is provided in the rear portion of the vehicle body frame 12. A space within the frame member 44 is an engine room R in which a rear wheel drive motor 58, an engine electric generator 62, and others are arranged. As shown in FIG. 1, the cargo bed 42 is mounted to cover an opening 46 (FIG. 7) of the engine room R.

As shown in FIG. 3, the seat support frame 90 includes a cross member 100 of a substantially round-pipe shape for supporting the front portion of the seat 18, two support elements 102a and 102b of a substantially round-pipe shape for supporting the cross member 100 at a predetermined height, and two longitudinal members 104a and 104b for supporting both side portions of the seat 18 in the vehicle width direction.

As shown in FIG. 3, the cross member 100 extends in the vehicle width direction. The upper end portion of the right support element 102a is continuous with the right end portion of the cross member 100, while the lower end portion of the right support element 102a is coupled to the main frame 22. The upper end portion of the left support element 102b is connected to the left end portion of the cross member 100, while the lower end portion end portion of the left support element 102b is connected to the main frame 22. The front end portion of the right longitudinal member 104a is coupled to the right end portion of the cross member 100, while the rear end portion of the right longitudinal member 104a is coupled to the front end portion of the right rear side frame 28. The front end portion of the left longitudinal member 104b is continuous with the left end portion of the cross member 100, while the rear end portion of the left longitudinal member 104b is coupled to the front end portion of the left rear side frame 28.

As shown in FIG. 3, the right longitudinal member 104a is provided with mounting elements 110a and 110b having holes 108 into which bolts 106 (FIG. 5) are inserted, while the left longitudinal member 104b is provided with a mounting element 110c having a hole 108 into which a bolt 106 (FIG. 5) is inserted. The second floor member 22b constituting the right side end portion of the main frame 22 is provided with a mounting element 110d having a hole 108 into which a bolt 106 (FIG. 5) is inserted.

As shown in FIG. 5, a first sub-frame 112 having a substantially round-pipe shape and extending in the vehicle width direction is removably mounted to the two longitudinal members 104a and 104b of the seat support frame 90, while a second sub-frame 114 having a substantially round-pipe shape and being bent in a substantially-L shape is removably mounted to the right longitudinal member 104a of the seat support frame 90 and the side end portion of the main frame 22. That is, the right end portion of the first sub-frame 112 is coupled to the mounting element 110b by the bolt 106 (FIG. 5) or the like, while the left end portion of the first sub-frame 112 is coupled to the mounting element 110c by the bolt 106 (FIG. 5) or the like. The left end portion of the second sub-frame 114 is coupled to the mounting element 110a by the bolt 106 (FIG. 5) or the like, while the right end portion of the second sub-frame 114 is coupled to the mounting element 110d by the bolt 106 (FIG. 5) or the like.

Figure 8:
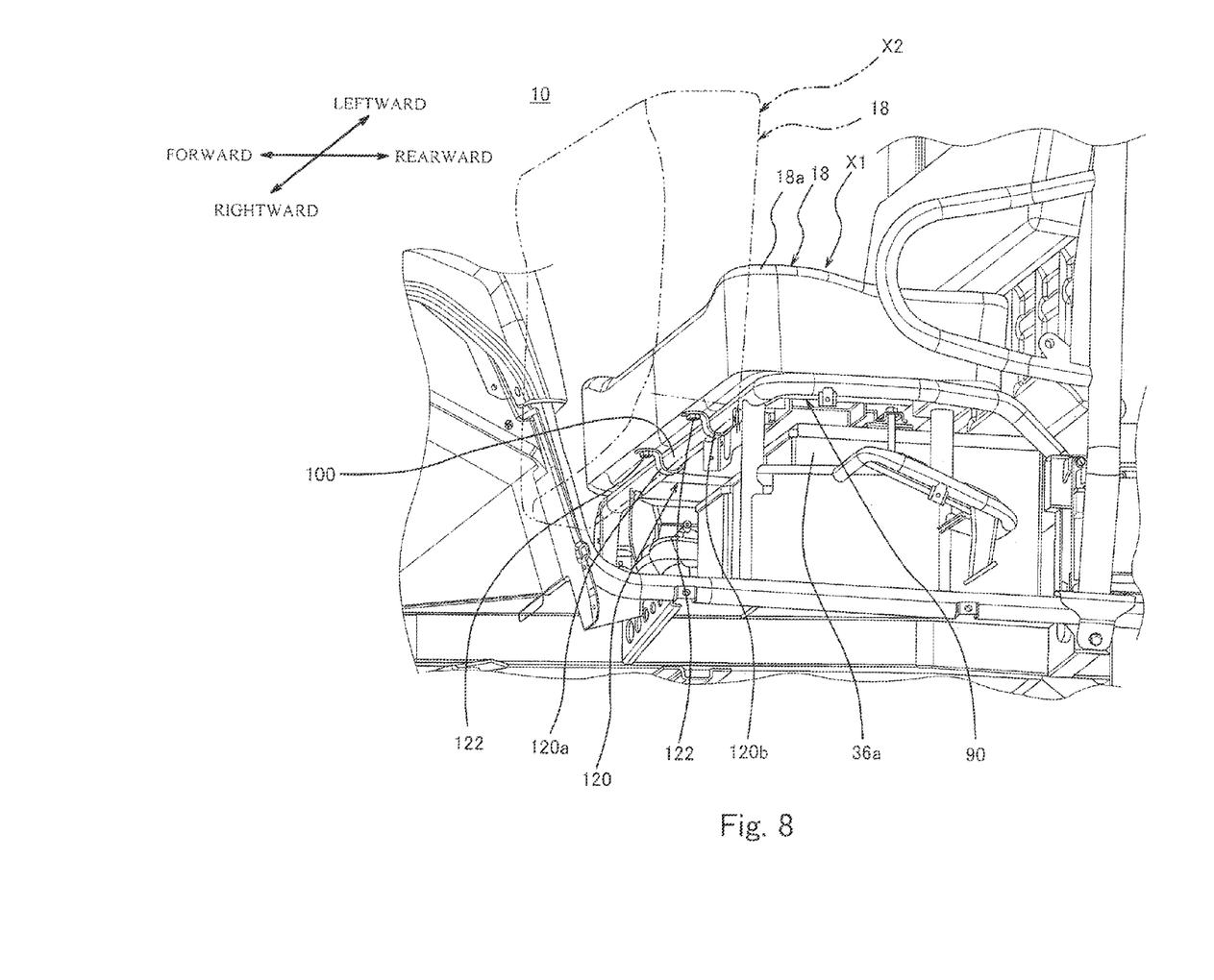
FIG. 8 is a perspective view showing a seat support frame, the seat, and a seat displacement mechanism, when viewed from obliquely below.

As shown in FIG. 5, the first sub-frame 112 and the second sub-frame 114 are members for supporting the rear portion of the seat 18 (FIG. 8). The seat 18 is supported over the plurality of batteries 36a~36d, by the cross member 100, the two longitudinal members 104a and 104b, the first sub-frame 112, and the second sub-frame 114.

As shown in FIG. 5, the cross member 100, the two support elements 102a and 102b, and the longitudinal members 104a and 104b are positioned not to overlap with the plurality of batteries 36a~36d when viewed from above. By comparison, the first sub-frame 112 and the second sub-frame 114 are positioned to overlap with the plurality of batteries 36a~36d when viewed from above. Therefore, in a state where the first sub-frame 112 and the second sub-frame 114 are mounted to the longitudinal member 104a (104b) or the main frame 22, the first sub-frame 112 and the second sub-frame 114 positioned over the batteries 36a~36d prevent the batteries 36a~36d from popping up even if they are disengaged from the battery support plates 32. On the other hand, in a state where the first sub-frame 112 and the second sub-frame 114 are detached from the longitudinal member 104a (104b) or the main frame 22, (see FIG. 3), the plurality of batteries 36a~36d can be lifted up straightly upward from the battery placement surfaces 32a, which allows an operator to replace the batteries 36a~36d more easily.

FIG. 8 is a perspective view showing the seat support frame 90, the seat 18, and a seat displacement mechanism 120, when viewed from obliquely below. As can be seen from FIG. 1, the seat 18 has a lateral length for allowing two passengers to be seated thereon side by side in the rightward and leftward direction. A portion of the seat 18 which is located leftward relative to the center of the seat 18 in the vehicle width direction is a driver seat 18a on which the driver is seated. As shown in FIG. 8, the front portion of the seat 18 is coupled to the seat support frame 90 via the seat displacement mechanism 120 such that the seat 18 is pivotable. The seat displacement mechanism 120 has two engagement elements 120a and 120b having a substantially-U shape. The engagement elements 120a and 120b are mounted to the front portion of the seat 18 by using bolts 122 such that they are apart from each other in the vehicle width direction. Substantially-semi-cylindrical portions of the engagement elements 120a and 120b are rotatably engaged with the outer peripheral surface of the cross member 100.

As indicated by solid lines of FIG. 8, in a state where the vehicle 10 is able to drive, the seat 18 is placed on the seat support frame 90, the first sub-frame 112 (FIG. 5) and the second sub-frame 114 (FIG. 5), above the plurality of batteries 36a~36d. The position of the seat 18 in a state where the seat 18 is placed on the seat support frame 90, the first sub-frame 112, and the second sub-frame 114 will be referred to as a first position X1. In a state where the seat 18 is in the first position X1, the rear portion of the seat 18 is secured to the seat support frame 90 by a lock mechanism (not shown). As indicated by two-dotted lines of FIG. 8, for example, when the batteries 36a~36d are replaced, the lock mechanism (not shown) is unlocked and then the operator lifts up the rear portion of the seat 18 with hands. In this case, the seat 18 is pivoted vertically upward around the engagement elements 120a and 120b of the seat displacement mechanism 120 to a position where the seat 18 does not overlap with the batteries 36a~36d when viewed from above. The position where the seat 18 does not overlap with the batteries 36a~36d when viewed from above is a second position X2. The seat displacement mechanism 120 allows the seat 18 to be vertically pivotable between the first position X1 and the second position X2.

Turning back to FIG. 1, a handle 48 is provided in front of the driver seat 18a, and a key switch 50 is provided in the vicinity of the handle 48 to enable the vehicle 10 to start. A hood 52 is mounted to a portion of the vehicle body frame 12 which is forward relative to the cabin space S. A brake lever 55 is provided at the left side of the driver seat 18a.

Figure 9:
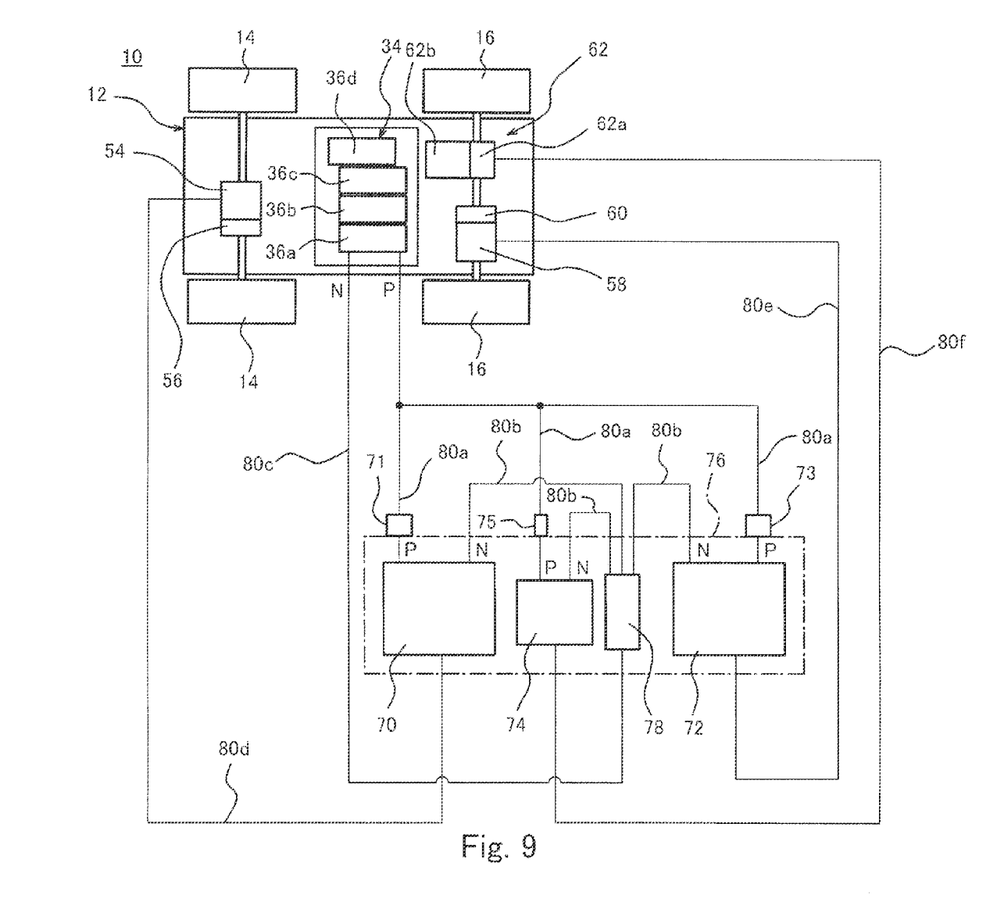
FIG. 9 is a view showing the layout of electric wires in the vehicle according to the embodiment.

FIG. 9 is a view showing the layout of electric wires in the vehicle 10. Referring to FIGS. 2 and 9, the vehicle 10 includes a front wheel drive motor 54 for driving the front wheels 14, a driving power transmission mechanism 56 for transmitting the driving power generated in the front wheel drive motor 54 to the front wheels 14, a rear wheel drive motor 58 for driving the rear wheels 16, a driving power transmission mechanism 60 for transmitting the driving power generated in the rear wheel drive motor 58 to the rear wheels 16, an engine electric generator 62, and the battery unit 34 including the plurality of batteries 36a~36d. In the present embodiment, the vehicle 10 is a series-hybrid vehicle, and the plurality of batteries 36a~36d of the battery unit 34 are charged with the electric power generated by the engine electric generator 62, and the front wheel drive motor 54 and the rear wheel drive motor 58 are actuated by the electric power supplied from the battery unit 34.

As shown in FIG. 2, the front wheels 14 are suspended from both end portions of the front portion of the main frame 22 in the vehicle width direction via suspension devices (not shown), and the front wheel drive motor 54 and the driving power transmission mechanism 56 are arranged at the center portion of the front portion of the main frame 22 in the vehicle width direction. As shown in FIG. 7, the rear wheels 16 are suspended from both end portions of the frame member 44 in the vehicle width direction via suspension devices 64, and the rear wheel drive motor 58, the driving power transmission mechanism 60 and the engine electric generator 62 are mounted to a sub-frame 66 disposed in the engine room R.

Referring to FIG. 9, the engine electric generator 62 includes an electric generator 62a and an engine 62b for actuating the electric generator 62a. The electric generator 62a operates as an electric generator for generating AC power charged into the batteries 36a~36d, or as a starter for starting the engine 62b. In the present embodiment, the engine 62b is a single-cylinder reciprocating engine, and a crankshaft (not shown) of the engine 62b extends vertically. The electric generator 62a is mounted to the lower portion of a crankcase (not shown) accommodating the lower end portion of the crankshaft.

Referring to FIGS. 2 and 7, the engine 62b of the engine electric generator 62 is positioned rightward relative to the center portion of the vehicle body frame 12 in the vehicle width direction, and a fuel tank 68 is disposed at the right side portion of the vehicle body frame 12 to feed a fuel to the engine 62b. That is, the engine 62b and the fuel tank 68 are positioned at an opposite side of the driver seat 18a (FIG. 1) in the vehicle width direction. In this way, a weight balance in the vehicle width direction can be maintained.

As shown in FIG. 2, the battery unit 34 is positioned at the center portion of the vehicle body frame 12 in the forward and rearward direction. As shown in FIG. 5, the plurality of batteries 36a~36d constituting the battery unit 34 are mounted to the upper surfaces of the battery support plates 32, i.e., the battery placement surfaces 32a, via the battery holders 38, respectively. As shown in FIG. 1, the driver seat 18a is positioned leftward relative to the center portion of the vehicle body frame 12 in the vehicle width direction. As shown in FIG. 2, the whole of the plurality of batteries 36a~36d are positioned rightward relative to the center portion of the vehicle body frame 12 in the vehicle width direction. To be specific, the center of gravity of the whole of the plurality of batteries 36a~36d is located at an opposite side of the driver seat 18a (FIG. 1) with respect to the center portion of the vehicle body frame 12 in the vehicle width direction. The rightmost battery 36d is positioned to protrude forward relative to the batteries 36a~36c. Thereby, there is formed a space in which the brake lever 55 is provided, at the left side of the leftmost battery 36a, and a space in which the fuel tank 68 is provided, behind the rightmost battery 36d.

As shown in FIGS. 4 and 6, each of the battery holders 38 includes a lower holder 130 for holding the lower portion of the corresponding one of the batteries 36a~36c (FIG. 5), a press member 132 for pressing the upper surface of the corresponding one of the batteries 36a~36d, and two coupling members 134 for coupling the battery support plate 32 to the press member 132.

As shown in FIG. 4, the lower holder 130 serves to inhibit horizontal displacement of the corresponding one of the batteries 36a~36c (FIG. 5). The lower holder 130 includes a bottom portion 130a with which the lower surface of the corresponding one of the batteries 36a~36c (FIG. 5) contacts, and side wall portions 130b extending upward from the edges of the bottom portion 130a. As shown in FIGS. 4 and 6, connecting elements 130c are provided at both end portions of the bottom portion 130a in the forward and rearward direction, and are connected to the battery support plate 32 by bolts 136 and the like. Stopper mechanisms 130e are provided at both end portions of the bottom portion 130a in the rightward and leftward direction and have holes 130d into which pipe elements 134a of the coupling members 134 are inserted, respectively. Furthermore, dampers 130f which are of a substantially plate shape and are made of rubber or the like are provided on the upper surface of the bottom portion 130a. Note that the lower holder 130 is omitted from the battery holder 38 corresponding to the rightmost battery 36d, because the first floor member 22a and the second floor member 22b can inhibit horizontal displacement of the rightmost battery 36d.

As shown in FIG. 6, the press member 132 includes a press plate 132a extending in the vehicle width direction, two damper retaining plates 132b provided on the lower surface of the press plate 132a such that they are apart from each other in the vehicle width direction, and dampers 132c provided on the lower surfaces of the damper retaining plates 132b and are made of rubber or the like. Holes 132d are provided on both end portions of the press plate 132a in the vehicle width direction. Bolts 134b of the coupling members 134 are inserted into the holes 132d, respectively.

As shown in FIG. 6, each of the coupling members 134 includes the pipe element 134a of a substantially round-pipe shape, extending between the battery support plate 32 and the press member 132 and coupled to the battery support plate 32 and to the press member 132, and two bolts 134b. The pipe element 134a has female threads 134c at upper and lower end portions thereof, respectively.

When the pipe element 134a is coupled to the battery support plate 32, the bolt 134b is inserted into a hole 32b of the battery support plate 32 and is threadingly engaged with the female thread 134c formed at the lower end portion of the pipe element 134a. When the pipe element 134a is coupled to the press plate 132a, the bolt 134b is inserted into a hole 132d of the press plate 132a and is threadingly engaged with the female thread 134c formed at the upper end portion of the pipe element 134a. As shown in FIG. 2, the plurality of batteries 36a~36d held by the battery holders 38, respectively, are interconnected via electric wires 37. In this way, the battery unit 34 can have a required voltage (e.g., 48V) and a required capacity.

As shown in FIG. 9, the vehicle 10 includes a front wheel drive motor controller 70 for controlling electric power supply to the front wheel drive motor 54, a rear wheel drive motor controller 72 for controlling electric power supply to the rear wheel drive motor 58, an electric generator controller 74 for controlling electric power supply to the engine electric generator 62, and a heat radiation plate 76.

As shown in FIG. 9, the front wheel drive motor controller 70 includes an inverter circuit (not shown) which converts the DC power (e.g., 48V) supplied from the battery unit 34 into AC power, and the AC power supplied from the front wheel drive motor 54 into DC power (e.g., 48V), and a control circuit (not shown) for controlling the magnitude or the like of AC power. The DC plus terminal (P) of the front wheel drive motor controller 70 is coupled to the plus terminal (P) of the battery unit 34 via a contactor 71 and a wire 80a. The DC minus terminal (N) of the front wheel drive motor controller 70 is coupled to the minus terminal (N) of the battery unit 34 via a wire 80b, a collective terminal 78 and a wire 80c. The AC terminal of the front wheel drive motor controller 70 is coupled to the front wheel drive motor 54 via a wire 80d. The contactor 71 is capable of switching between connection and disconnection of an electric circuit for supplying the electric power. In the present embodiment, the electric power supply is enabled when the key switch 50 (FIG. 1) is ON, while the electric power supply is inhibited when the key switch 50 (FIG. 1) is OFF.

Referring to FIG. 9, the rear wheel drive motor controller 72 includes an inverter circuit (not shown) which converts DC power (e.g., 48V) supplied from the battery unit 34 into AC power, and converts AC power supplied from the rear wheel drive motor 58 into DC power (e.g., 48V), and a control circuit (not shown) for controlling the magnitude of AC power, or the like. The DC plus terminal (P) of the rear wheel drive motor controller 72 is coupled to the plus terminal (P) of the battery unit 34 via a contactor 73 and a wire 80a. The DC minus terminal (N) of the rear wheel drive motor controller 72 is coupled to the minus terminal (N) of the battery unit 34 via a wire 80b, the collective terminal 78 and a wire 80c. The AC terminal of the rear wheel drive motor controller 72 is coupled to the rear wheel drive motor 58 via a wire 80e. The contactor 73 is capable of switching between connection and disconnection of an electric circuit for supplying the electric power. In the present embodiment, the electric power supply is enabled when the key switch 50 (FIG. 1) is ON, while the electric power supply is inhibited when the key switch 50 (FIG. 1) is OFF.

Referring to FIG. 9, the electric generator controller 74 includes an inverter circuit (not shown) which converts the DC power (e.g., 48V) supplied from the battery unit 34 into AC power, and converts AC power supplied from the engine electric generator 62 into DC power (e.g., 48V), and a control circuit (not shown) for controlling the engine electric generator 62. The DC plus terminal (P) of the electric generator controller 74 is coupled to the plus terminal (P) of the battery unit 34 via a contactor 75 and a wire 80a. The DC minus terminal (N) of the electric generator controller 74 is coupled to the minus terminal (N) of the battery unit 34 via a wire 80b, the collective terminal 78 and a wire 80c. The AC terminal of the electric generator controller 74 is coupled to the engine electric generator 62 via a wire 80f. The contactor 75 is capable of switching between connection and disconnection of an electric circuit for supplying the electric power, and is controlled by a control circuit (not shown) of the electric generator controller 74.

As shown in FIG. 7, the heat radiation plate 76 supports the front wheel drive motor controller 70, the rear wheel drive motor controller 72, and the electric generator controller 74 (FIG. 9), and radiates heat generated in these controllers. The heat radiation plate 76 has a substantially tray shape formed by bending one metal plate member. The heat radiation plate 76 is coupled to the side surface of the rear side frame 28.

Referring to FIG. 9, to start-up the vehicle 10, the driver turns ON the key switch 50 (FIG. 1), thereby allowing the contactors 71 and 73 to supply the electric power. Then, the front wheel drive motor controller 70 converts the DC power of the battery unit 34 into AC power, which actuates the front wheel drive motor 54. Also, the rear wheel drive motor controller 72 converts the DC power of the battery unit 34 into AC power, which actuates the rear wheel drive motor 58. When the value of SOC (state of charge) of the battery unit 34 decreases to a value less than a predetermined value with a passage of a driving time of the utility vehicle 10, the electric generator 62a of the engine electric generator 62 starts the engine 62b by the driver's operation or automatically. Then, the engine 62b actuates the electric generator 62a to generate AC power. The electric generator controller 74 converts the AC power generated in the electric generator 62a into DC power, which is charged into the battery unit 34. In the case where the front wheel drive motor 54 and the rear wheel drive motor 58 operate as regenerative brakes, the AC power generated in the front wheel drive motor 54 is converted into DC power by the front wheel drive motor controller 70 and the AC power generated in the rear wheel drive motor 58 is converted into DC power by the rear wheel drive motor controller 72. The DC power is charged into the battery unit 34.

In accordance with the vehicle 10 of the present embodiment configured above, the follow advantages are achieved.

As shown in FIG. 4, since the battery placement surfaces 32a of the battery support plates 32 are positioned below the upper surface 24a of the floor panel 24, the center of gravity of the whole of the plurality of batteries 36a~36d placed on the battery placement surfaces 32a can be lowered. As a result, the vehicle 10 can drive more stably.

As shown in FIG. 2, the driver seat 18a (FIG. 1) is positioned leftward relative to the center portion of the vehicle body frame 12 in the vehicle width direction and the center of gravity of the whole of the plurality of batteries 36a~36d is located rightward relative to the center portion of the vehicle body frame 12 in the vehicle width direction, and at an opposite side of the driver seat 18a (FIG. 1). Because of this layout, the center of gravity of a total load which is a sum of the weight of the whole of the plurality of batteries 36a~36d and the weight of the driver seated on the driver seat 18a (FIG. 1) can be located at a substantially center portion of the vehicle body frame 12 in the vehicle width direction. As a result, the vehicle 10 can drive more stably.

As shown in FIG. 8, the seat 18 can be displaced from the first position X1 to the second position X2 by the seat displacement mechanism 120. As shown in FIG. 5, the first sub-frame 112 and the second sub-frame 114 can be detached from the longitudinal member 104a (104b) or the main frame 22. Therefore, when the batteries 36a~36d are replaced, the operator can lift up the batteries 36a~36d (FIG. 5) straightly upward from the battery placement surfaces 32a (FIG. 5). Thus, the operator can replace the batteries 36a~36d more easily.

As shown in FIG. 6, the first floor member 22a has a substantially rectangular cross-sectional shape, and the vertical length H1 of the first floor member 22a is set much greater than the width W of the first floor member 22a. Therefore, the stiffness of the main frame 22 applied with the load of the batteries 36a~36d can be enhanced in the vertical direction in which the load is applied to the main frame 22.

As shown in FIG. 6, the vertical length H2 of the joint portion 94 is set greater than the width W of the first floor member 22a and smaller than the vertical length H1 of the first floor member 22a. Therefore, the portion of the battery support plate 32 and the portion of the first floor member 22a which are joined together can be increased in area, and as a result, a high joint stiffness between them is attained, as compared to a case where a part of the battery support plate 32 is joined to the lower surface of the first floor member 22a.

As shown in FIG. 6, in the present embodiment, the joint portion 94 of the battery support plate 32 is joined to the first floor member 22a of the main frame 22 by welding. In alternative embodiments, the joint portion 94 and the first floor member 22a may be joined together by means of a bolt and a nut (not shown).

As shown in FIG. 6, in the present embodiment, the pipe element 134a of the battery holder 38 is coupled to the battery support plate 32 by means of the bolt 134b. In alternative embodiments, a hook may be formed on the lower end portion of the pipe element 134a or a rod element (not shown) and may be engaged with the lower surface of the battery support plate 32.

As shown in FIG. 2, in the present embodiment, the driver seat 18a (FIG. 1) is positioned leftward relative to the center portion of the vehicle body frame 12 in the vehicle width direction, and the center of gravity of the whole of the plurality of batteries 36a~36d is located rightward relative to the center portion of the vehicle body frame 12 in the vehicle width direction. In alternative embodiments, they may be reversed in positional relationship in the rightward and leftward direction.

As shown in FIG. 8, in the present embodiment, the seat displacement mechanism 120 including the two engagement elements 120a and 120b is used. In alternative embodiments, another seat displacement mechanism may be used so long as it is capable of displacing the seat 18 between the first position X1 and the second position X2.

As shown in FIG. 1, in the present embodiment, the present invention is applied to the four-wheeled utility vehicle. In alternative embodiments, the present invention may be applied to other vehicles such as ATVs (all terrain vehicles), two-wheeled vehicles, or three-wheeled vehicles.

As shown in FIG. 9, in the present embodiment, the present invention is applied to the series hybrid vehicle 10. In alternative embodiments, the present invention may be applied to hybrid vehicles such as parallel hybrid vehicles, or series-parallel hybrid vehicles. In a further alternative embodiment, the present invention may be applied to a two-wheeled vehicle including a drive wheel which is either the front wheel 14 or the rear wheel 16.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle comprising:
 a vehicle body frame;
 a drive wheel suspended from the vehicle body frame;
 a drive motor for driving the drive wheel;
 a battery for supplying electric power to the drive motor;
 a floor panel for constituting a floor surface of the vehicle;
 a battery support plate having a battery placement surface on which the battery is placed;
 a seat on which a driver/passenger is seated; and
 a seat support frame for supporting the seat;
 wherein the battery support plate and the floor panel are supported on the vehicle body frame;
 the battery placement surface is positioned below an upper surface of the floor panel;
 the battery is positioned below the seat and inwardly relative to both end portions of the seat support frame in a vehicle width direction; and
 an upper surface of the battery is positioned above the upper surface of the floor panel and below an upper surface of the seat.

2. The vehicle according to claim 1,
 wherein the seat support frame has a portion positioned outwardly relative to the battery in the vehicle width direction; and
 the battery is placed to extend in the vehicle width direction.

3. The vehicle according to claim 1,
 wherein the seat support frame has a portion positioned forward relative to the battery.

4. The vehicle according to claim 1,
 wherein a brake lever is provided at one side of the seat in the vehicle width direction, adjacently to the seat; and
 the battery is placed to extend in the vehicle width direction.

5. The vehicle according to claim 1,
 wherein a space is provided behind the battery to place a fuel tank therein.

6. The vehicle according to claim 1, further comprising;
 a battery holder for mounting the battery placement surface.

* * * * *